May 14, 1957
R. L. PAGE
2,792,234
SWIVEL CONNECTION FOR VEHICLE FRAMES
Filed Aug. 23, 1955
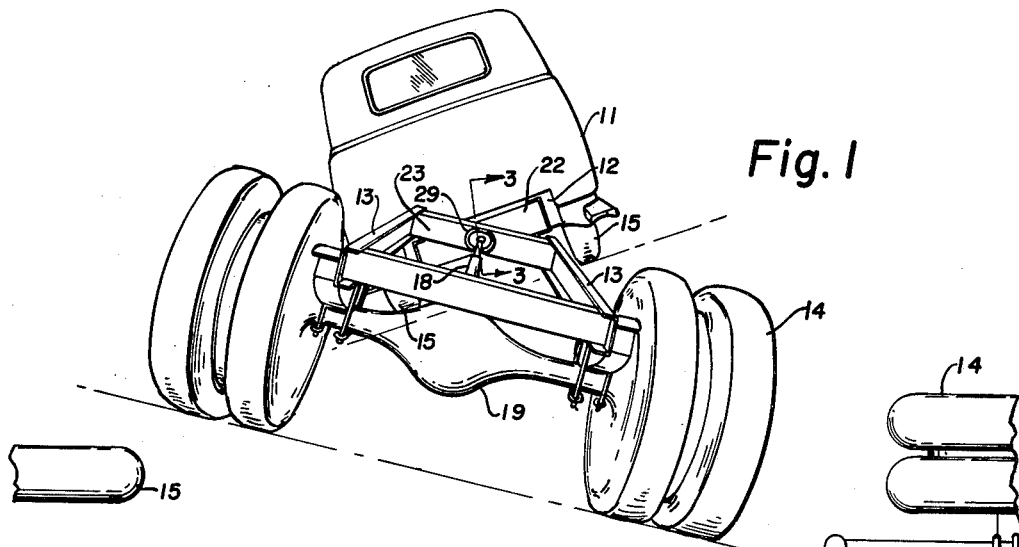
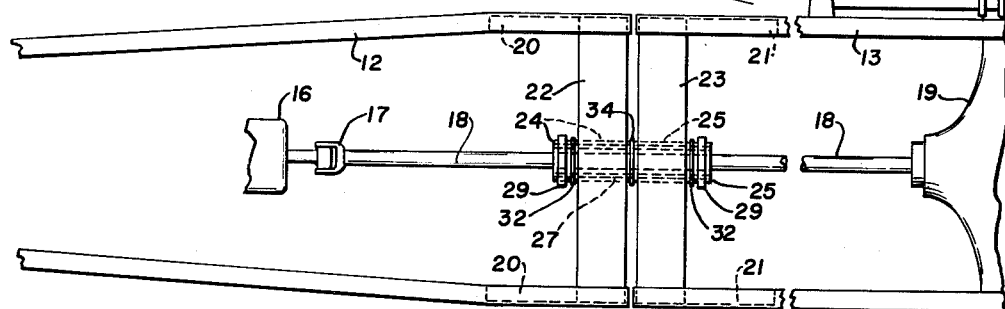
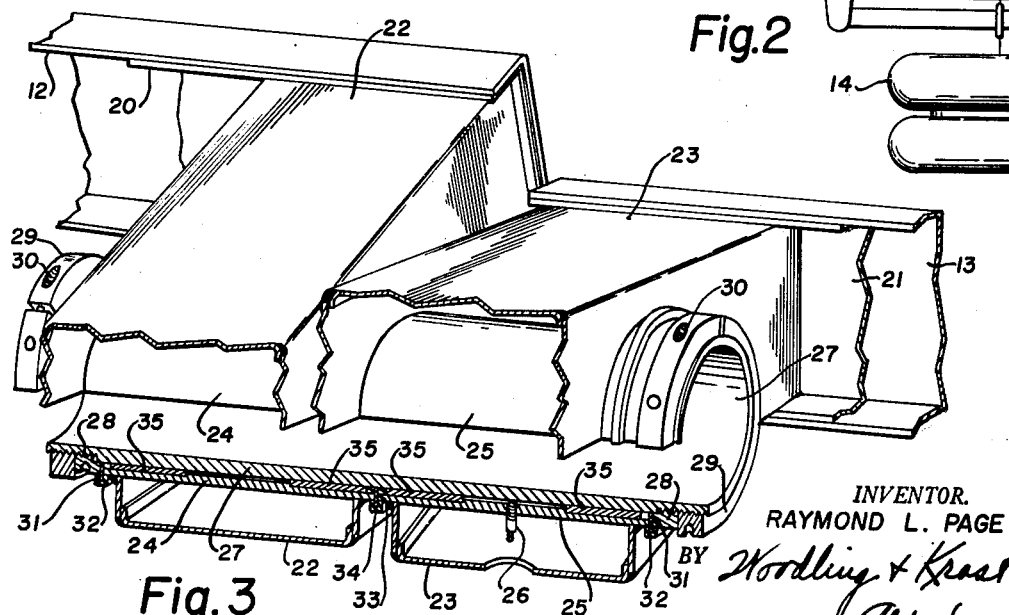
INVENTOR.
RAYMOND L. PAGE
BY Woodling & Krost
Attys.

United States Patent Office 2,792,234
Patented May 14, 1957

2,792,234

SWIVEL CONNECTION FOR VEHICLE FRAMES

Raymond L. Page, Brecksville, Ohio, assignor to Truckstell Manufacturing Company, a corporation of Ohio Application August 23, 1955, Serial No. 530,066

3 Claims. (Cl. 280—112)

My invention relates to the pivot connections between divided sections of a vehicle frame.

In the constructions to which my invention is related a vehicle frame, such as a truck frame, is in two sections—a forward section and a rearward section. These sections are arranged so that each may pivot around the axis of the vehicle frame in the general manner of that illustrated in U. S. Patent No. 2,366,166 issued January 2, 1945, to Harry Edward Willock. The present invention constitutes a modification, alternate construction, and improvement upon the arrangement shown in said Willock Patent No. 2,366,166.

An object of my invention is to provide for improved operation in a pivot connection between frame sections of a vehicle frame.

Another object is the provision of a construction arranged to provide bearing surfaces in the most efficient and functionally proper manner.

Another object is the provision for arranging the parts in a swivel connection so as to provide improved and safer results in operation.

Another object is to provide an improved structural arrangement in a pivot connection for a vehicle frame and so arranged as to facilitate ready replacement and repair of parts.

Another object is the provision of an improved pivot construction in a divided vehicle frame arranged to provide the freest and most efficient swivel operation.

Another object is the provision of a construction in such a swivel construction arranged to direct the forces of stress and strain, in the most efficient and functionally proper manner.

Another object is the provision for a construction which imparts strength, durability and operating efficiency to the swivel connection between the sections of a divided vehicle frame.

Other objects and a fuller understanding of the invention may be had by referring to the following description and claims, taken in conjunction with the accompanying drawing, in which:

Figure 1 is a rear view of a truck embodying my invention and illustrating the use of the device;

Figure 2 is a plan vew of the chassis of the truck shown in Figure 1 and illustrating the construction of my device in the truck chassis; and Figure 3 is an enlarged sectional and perspective view of the device embodying my invention and taken generally along the line 3—3 of Figure 1, and having the drive shaft removed to better disclose the construction of the invention.

The vehicle frame to which my invention is applied and as illustrated in the drawing, has a front frame section 12 and a rear frame section 13. These are divided so that they may rock about the axis of the vehicle chassis and relative to each other. A truck cab 11 is mounted upon the front frame section 12 and a body, not shown, may be mounted on the rear frame section 13. The rear wheels 14 of the truck or other vehicle are mounted upon a rear axle in an axle housing 19 suitably connected by springs to the rear frame section 13. Front wheels 15 are similarly mounted on a front axle connected by springs to the front frame section 12. A motor or engine 16 is connected to a drive shaft 18 through a universal joint 17 to the rear axle in the axle housing 19 in the usual manner.

At adjoining ends of the front and rear frame sections 12 and 13 there are positioned reinforcing linings 20 and 21, respectively. The linings 20 and 21 are of U-shaped steel form and are welded or bonded to the opposite side panels of the respective frame sections, linings 20 being welded or otherwise secured to the side members of the front frame section and linings 21 being welded or otherwise secured to the side members of the rear frame section. Welded or otherwise secured to the linings 20 attached to the front frame section 12 is a front transverse member 22 extending across from one side to the other of the front frame section 12. Also, welded or otherwise suitably secured to the reinforcing linings 21 of the rear frame section 13 is a rear transverse member 23 extending across from one side to the other of the rear frame section 13. The transverse members 22 and 23 are approximately parallel to each other and are spaced far enough apart that each may move relative to the other without interference, the transverse members 22 and 23 being arranged to rock relative to each other about the axis of the vehicle frame.

It is to be noted that the transverse members 22 and 23 are of box-like construction and have a rectangular shape in cross-section. Each transverse member has a forward and rearward wall which walls are substantially parallel to each other and have an upper and lower wall joining the forward and rearward walls to brace the same against deflection and to impart rigidity and strength to the transverse members. There are aligned openings through the transverse members 22 and 23 at the axis of the vehicle frame and extending through the opening in the transverse member 22 is a front sleeve member 24 and extending through the opening in the transverse member 23 is a rear sleeve member 25. The sleeve members 24 and 25 are of cylindrical shape and of equal diameter and are so arranged that they register. The front sleeve member 24 is welded or otherwise suitably secured to the forward and rearward walls of the transverse member 22 and similarly the rear sleeve member 25 is welded or otherwise suitably secured to the forward and rearward walls of the transverse member 23 so that the sleeve members 24 and 25 are rigidly and firmly secured to the transverse members. Lubrication fittings, such as the lubrication fitting 26, are mounted in the sleeve members 24 and 25. An access is provided to these fittings through suitable openings in the transverse members.

Axially aligned with and extending through both of the sleeve members 24 and 25 is a tubular member 27 which acts as a pivot pin between the sleeve members. The tubular member 27 is in rotative engagement with the sleeve members and is in axial alignment therewith. On the opposite ends of the tubular member 27 there are thrust nuts 28 which provide flanges or enlargements upon the ends of the tubular member and thus resist withdrawal of the tubular member from the sleeve members. Locking the thrust nuts 28 to the ends of the tubular member 27 are two lock nuts 29, which are firmly locked to the outer ends of the tubular member by means of the transverse locking bolts 30.

At the outer ends of the sleeve members 24 and 25 and next adjacent to the thrust nuts 28 are end-thrust washers or bushings 31, so positioned as to receive end-thrust between the outer ends of the sleeve members and the thrust nuts 28. Annular rubber seals 32 are disposed over the end-thrust washers or bushings 31 so as to protect them from foreign material. Positioned between the sleeve members 24 and 25 so as to receive axial thrust therebetween is a middle thrust washer or bushing 33. Similarly, an annular rubber seal 34 is positioned over the thrust washer or bushing 33. It is seen that the end-thrust washers or bushings 31 and the middle washer or bushing 33 are arranged to receive axial thrust and to provide bearing surfaces between the adjoining parts, these washers or bushings preferably being made of bronze or other suitable bearing material.

Positioned between the tubular member 27 and the sleeve members 24 and 25 are four annular bronze bushings 35 arranged to receive radial thrust between the tubular member 27 and the sleeve members 24 and 25. Each of the bronze bushings 35 is disposed in the plane of the forward and rearward walls of the transverse members 22 and 23 and thus particularly receive radial thrust in those planes.

It is to be noted that the arrangement is such that the tubular member 27 is free to readily rotate relative to both of the sleeve members 24 and 25 and so that each sleeve member may revolve about the tubular member 27 independently of the movement of the other sleeve member. The arrangement of the radial thrust bushings and the axial thrust bushings is such that there is a maximum of free swiveling movement between the two frame sections.

By having the thrust nuts 28 and lock nuts 29 detachable from the tubular member 27, the tubular member may be readily removed and replaced by removing the thrust nut and lock nut at either desired end of the tubular member 27 and thus withdrawing the tubular member 27 from the aligned sleeve members 24 and 25. The tubular member 27 is preferably of hardened ground steel to provide a true and long-wearing pivot pin connecting the sleeve members and providing a durable and accurate swivel connection between the frame sections of the vehicle chassis.

Inasmuch as the tubular member 27, in the embodiment of the invention illustrated, is hollow throughout its length, the drive shaft 18 may extend axially through the tubular member 27 as illustrated in Figures 1 and 2. If desired, the drive shaft may be disposed externally of the tubular member 27, that is, below and in alignment with the axis of the tubular member 27. For purposes of illustration, the drive shaft 18 shown as extending axially through the swivel connection formed by the tubular member 27 and sleeve members 24 and 25 in Figures 1 and 2, has been eliminated in the view of Figure 3.

It may be also noted that braces and other cross-pieces which may extend between the longitudinal side members of the front frame section 12 and the rear frame section 13 have not been shown in the drawing. The omission of these braces and other cross-pieces has been made to help clarify the illustration of the drawing as such braces and other cross-pieces do not form part of my invention.

In all cases, the pivot pin is rotatably mounted in both aligned sleeve members and both sleeve members with the transverse members carried thereby may freely rock with respect to each other upon the pivot pin.

The present disclosure includes that contained in the appended claims as well as that in the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A swivel connection between a front frame portion and a rear frame portion of a vehicle having a divided frame, comprising the combination of a first transverse member carried by the said front frame portion and transversely thereof, a second transverse member carried by the said rear frame portion and transversely thereof, each of said transverse members having a forward wall, a rearward wall, an upper wall and a lower wall joined to define an enclosed space therebetween, said transverse members being spaced apart longitudinally of the said frame, said transverse members having aligned openings extending axially of said frame and through the forward and rearward walls, respectively, of the transverse members, a first cylindrical sleeve extending through the aligned openings of the first transverse member and fixedly secured to said first transverse member, a second cylindrical sleeve extending through the aligned openings of the second transverse member and fixedly secured to said second transverse member, a tubular member extending through said first and second cylindrical sleeves and in axial alignment therewith, retaining means secured to the said tubular member adjacent the opposite ends thereof for restraining axial movement of the tubular member relative to the said cylindrical sleeves, said retaining means engaging the first cylindrical sleeve adjacent the forward wall of said first transverse member and the second cylindrical sleeve adjacent the rearward wall of said second transverse member to impose axially directed force on said sleeves upon forward movement of the front frame portion, said walls bracing said tubular member against radially directed force exerted on said sleeves at said walls, said tubular member being free to rotate on its axis relative to the first cylindrical sleeve and relative to the second cylindrical sleeve, and bearing means positioned intermediate the tubular member and both cylindrical sleeves in the planes of the forward and rearward walls of the first and second transverse members, respectively, to receive radial thrust in said planes.

2. Apparatus for pivotally connecting the forward and rearward frame sections of a transversely divided vehicle, comprising first and second transverse members arranged alongside of each other and transversely of the vehicle, the first transverse member being secured to the forward section and the second transverse member being secured to the rearward section, said transverse members having rectangular cross-sections at the axis of the vehicle to provide forward and rearward parallel walls, a pair of sleeve members in registration and aligned along the axis of said vehicle, the first of said sleeve members being disposed through, and carried by, opposite parallel walls of said first transverse member, the second of said sleeve members being disposed through, and carried by, opposite parallel walls of said second transverse member, a pin member extending through said sleeve members and in axial alignment therewith, both said sleeve members being revolvable about said pin member and relative to each other, head elements carried by said pin member adjacent the opposite ends thereof, respectively, and adjacent the forward wall of the first transverse member and the rearward wall of the second transverse member to prevent axial withdrawal of said pin member from said sleeve members, at least one of said head elements being detachable from said pin member to permit axial withdrawal of the pin member from said sleeve members, and bearing bushings positioned between said pin member and said sleeve members in the radial plane of the forward and rearward walls of said transverse members to receive radial thrust between the pin member and sleeve members at axially spaced locations in said planes and adjacent the opposite ends of the sleeve members, respectively, and positioned between said head elements and said sleeve members to receive axial thrust at both of said ends of the pin member.

3. In a swivel connection between front and rear sections of a vehicle, the combination of a pair of transverse members of box-like cross-section each having a forward and rearward parallel wall and an upper and lower parallel wall bracing said forward and rearward walls against deflections relative to each other, said transverse members being disposed adjacent each other, one carried by the front section and the other carried by the rear section, a pair of sleeve members in registration with each other and axially aligned along said vehicle frame, one of said sleeve members extending through the forward and rearward parallel walls of the transverse member of the front frame section, the other of said sleeve members extending through the forward and rearward parallel walls of the transverse member of the rear frame section, a tubular member rotatively mounted in both said sleeve members to permit rotation of the sleeve members relative to each other and to the tubular member, flanges on the opposite ends of the tubular member and adjacent the forward wall of the first transverse member and adjacent the rearward wall of the second transverse member to retain the tubular member in said sleeve members, first bearing bushings positioned between the tubular member and the sleeve members in the planes of said forward and rearward parallel walls of both said transverse members to provide bearing engagement for radial thrust between the tubular member and the sleeve members in said planes, and second bearing bushings positioned between the said flanges and the respective sleeve members adjacent the forward wall of the first transverse member and the rearward wall of the second transverse member to provide bearing engagement for axial thrust at locations adjacent the planes of the forward wall of the first transverse member and of the rearward wall of the second transverse member.

References Cited in the file of this patent
UNITED STATES PATENTS

| | | |
|---|---|---|
| 1,886,319 | Cohen | Nov. 1, 1932 |
| 2,366,166 | Willock | Jan. 2, 1945 |